United States Patent [19]

Jarvis

[11] E Re. 30,154

[45] Reissued Nov. 20, 1979

[54] JOINING

[75] Inventor: Arthur B. Jarvis, Andover, Mass.

[73] Assignee: Bose Corporation, Framingham, Mass.

[21] Appl. No.: 845,256

[22] Filed: Oct. 25, 1977

Related U.S. Patent Documents

Reissue of:

[64] Patent No.: 4,042,307
Issued: Aug. 16, 1977
Appl. No.: 719,942
Filed: Sep. 2, 1976

[51] Int. Cl.[2] ..... F16B 2/14

[52] U.S. Cl. ..... 403/290; 403/381; 403/248; 403/277

[58] Field of Search ..... 403/381, 290, 248, 251, 403/249, 409, 297, 277, 268, 267

[56] References Cited

U.S. PATENT DOCUMENTS

| | | | |
|---|---|---|---|
| 291,851 | 1/1884 | Murphy | 403/248 |
| 2,011,529 | 8/1935 | Shaw | 403/297 |
| 2,021,490 | 11/1935 | Rigandi | 403/251 |
| 2,053,382 | 9/1936 | Stickley | 403/268 |
| 2,117,229 | 5/1938 | Sugg | 403/251 |
| 2,947,040 | 8/1960 | Schultz | 403/290 X |
| 3,341,261 | 9/1967 | Fenlin | 403/277 X |
| 3,405,592 | 10/1968 | Blodee | 403/267 X |
| 3,669,512 | 6/1972 | Parks | 403/248 |
| 3,864,852 | 2/1975 | Evans | 403/409 |

FOREIGN PATENT DOCUMENTS

| | | | |
|---|---|---|---|
| 1045292 | 6/1953 | France | 403/297 |
| 22861 | 10/1900 | Switzerland | 403/248 |

*Primary Examiner*—Andrew V. Kundrat
*Attorney, Agent, or Firm*—Charles Hieken

[57] ABSTRACT

A joint is formed by pushing a grooved tenon into a dovetail-shaped mortise containing a barbed wedge such that the wedge is forced into the tenon groove, thereby spreading the tenon to the dovetail shape of the mortise and anchoring the barbs into the tenon, thus securing the joint and preventing the tenon and mortise from separating.

5 Claims, 3 Drawing Figures

JOINING

Matter enclosed in heavy brackets [ ] appears in the original patent but forms no part of this reissue specification; matter printed in italics indicates the additions made by reissue.

BACKGROUND OF THE INVENTION

The present invention relates in general to joining two pieces of solid material and more particularly concerns a novel joint that may be rapidly and economically established to form a permanent secure connectin between two parts. The invention is especially useful in joining parts of a loudspeaker cabinet.

One method of joining wood parts comprises a moisture-expansive wood wedge glued inside a straight-sided mortise. A disadvantage is that the joint must remain immobile while the glue dries, preventing immediate use of the joint, thereby appreciably increasing the time and cost of assembly.

It is an important object of this invention to provide an improved joint.

It is another object of the invention to achieve the preceding object with a joint with substantially permanent holding power.

It is another object of the invention to achieve one or more of the preceding objects independently of glue.

It is a further object of the invention to achieve one or more of the preceding objects with a wide variety of materials.

It is still a further object of the invention to achieve one or more of the preceding objects rapidly and economically.

SUMMARY OF THE INVENTION

According to the invention, one piece of solid material has a grooved projection. A second piece of solid material has a dovetail-shaped slot of outer width corresponding substantially to the width of the projection on the first piece. A barbed wedge of hard material, preferably metal or plastic, resides within the slot with the wedge base on the slot base, the wedge top facing the opening and points on the wedge sides facing the slot sides. Preferably the wedge is formed with a slot of generally triangular cross section facing the slot base. According to the invention, the grooved projection of the first piece is forced into the slot of the second piece to urge the wedge into the groove of the projetion so that the wedge spreads the groove open until the sides of the projection engage the walls of the dovetail-shaped slot while the wedge point becomes embedded in the groove of the projection, preventing the groove from closing and locking the projection into the slot to establish a mechanically secure permanent joint without glue. If desired, glue or other material may be first introduced into the slot to form a substantially fluid-tight joint.

Numerous other features, objects and advantages of the invention will become apparent from the following specification when read in connection with the accompanying drawing in which:

DETAILED DESCRIPTION OF PREFERRED EMBODIMENTS

Figure 1:
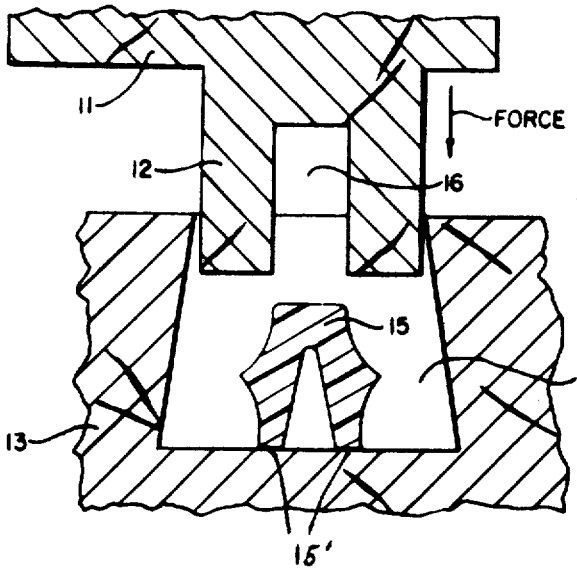
FIG. 1 is a sectional view of the components of the joint before joining according to the invention.

With reference now to the drawing and more particularly FIG. 1 thereof, there is shown a sectional view of the components of the joint according to the invention. A piece 11 of solid material, which may be wood, plastic or other suitable material, has a grooved projection or tongue 12. A second piece 13 of solid material, which may be wood, plastic, metal or other suitable material, has an angled slot or mortise 14 of trapezoidal cross section with outer width slightly greater than the width of projection 12 and less then the width of the base of slot 14. A barbed wedge 15 formed with a triangular groove 21 facing the base of slot 14 rests on this base with its top facing slot 16 of projection 12 and its barbed sides facing the sides of slot 14. The width of wedge 15 at the top and across the barbs is respectively less and greater than the width of groove 16.

Figure 2:
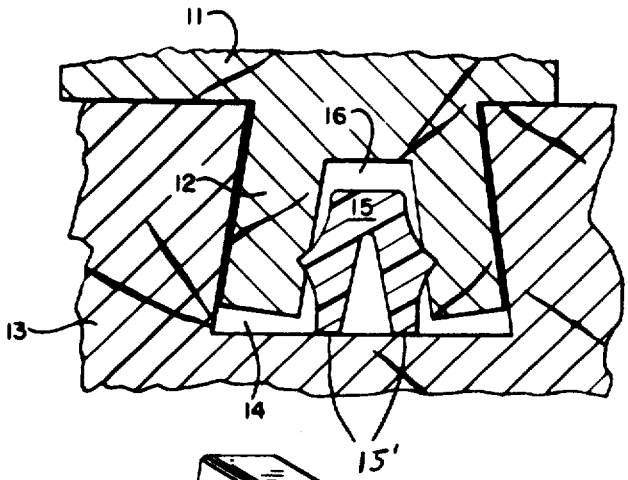
FIG. 2 is a sectional view of the completed joint according to the invention.

Referring to FIG. 2, there is shown a sectional view of the completed joint. Urging pieces 11 and 13 together forces projection 12 into slot 14 and wedge 15 into groove 16 of projection 12. As pieces 11 and 13 move together, wedge 15 expands groove 16, causing the sides of projection 12 to engage the walls of slot 14. Coincidently barbs, points or tynes 17 of wedge 15 embed themselves in the walls of projection 12 inside groove 16, keeping groove 16 expanded and locking projection 12 into slot 14. *Wedge 15 is formed with means defining a flat surface 15' that engages the base of slot 14.*

Figure 3:
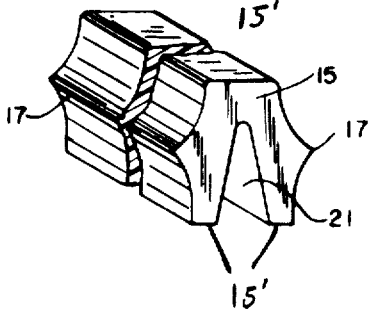
FIG. 3 is a perspective contracted view of an exemplary wedge according to the invention.

Referring to FIG. 3, there is shown a contracted perspective view of wedge 15. Slit 21 of triangular cross section helps insure that wedge 15 may expand to spread projection 12 into engagement with the walls beside slot 14 while narrowing to relieve pressure as projection 12 encounters resistance from the walls beside slot 14. This arrangement helps prevent fracture of pieces 11 and 13. Wedge 15 is preferably shaped so that the angle between the walls beside slot 21 are two degrees to five degrees wider than the angle between the walls beside slot 14 to insure that barbs 17 bite into the sides of groove 16 in projection 12. The latter angle is typically 14°. The height of triangular slot 21 is typically 70% of the height of wedge 15. Wedge 15 may be of any length.

If desired, a bonding or sealing agent may also be used in groove 16 and/or slot 14, such as glue, to establish a substantially fluid-tight seal and/or increase the strength of the joint. Wedge 15 may be made of metal, plastic or other suitable material, preferably at least as hard as the material of pieces 11 and 13 so that barbs 17 will deform the walls beside groove 16. Wedge 15 may extend for substantially all or a fraction of the length of projections 12 and slot 14. Alternatively, a number of wedges 15 may be spaced along the length of the joint.

A feature of the invention is that it provides a stable permanent joint that may be handled immediately and requires no holding fixtures. The result is more rapid and economical assembly. The invention may be used to join a wide variety of materials at a wide variety of angles.

In a specific embodiment of the invention joining wooden pieces of a loudspeaker cabinet, typically ¾-inch baraboard that may be veneered, projection 12 is typically 0.37 inches wide, groove 16 is typically 0.125 inches wide, the height of projection 12 is typically 11/32 inch, the height of groove 16 is typically 8/32 inch, the depth of groove 14 is typically 0.39 inches and its top and bottom widths are typically 0.38 inches and 0.50 inches, respectively. The width of barb 15 at its base is typically 0.17 inches and across the barbs 17 is typically 0.23 inches.

There has been described novel apparatus and techniques for joining two pieces of solid material economically and rapidly in a joint characterized by substantial stability and permanence. Numerous other departures from and modifications of the specific embodiments described herein may now be practiced by those skilled in the art without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A joint comprising, a first piece of material having a projection with a groove, a second piece of material having a slot embraced by angled walls with the width of the slot opening slightly greater than the width of said projection and less than the slot width at its base, and wedge means located within said slot and said groove, for expanding said groove and urging said projection into engagement with the walls beside said slot, said wedge means being formed with a slit having an opening adjacent to the base of said slot.

2. A joint in accordance with claim 1 wherein said wedge means is formed with barbs on each side for engagement with inside walls of said projection beside said groove.

3. A joint in accordance with claim 1 wherein the wedge means slit is of triangular cross section with the triangular base at the base of said slot.

4. A joint in accordance with claim 3 wherein the triangle height is substantially 70% of the wedge means height.

*5. A joint comprising,*

*a first piece of material having a projection with a groove,*

*a second piece of material having a slot embraced by angled walls with the width of the slot opening slightly greater than the width of said projection and less than the slot width at its base,*

*and wedge means located within said slot and said groove and having means defining a flat surface engaging the base of said slot for expanding said groove and urging said projection into engagement with the walls beside said slot,*

*said wedge means being formed with barbs on each side for engagement with inside walls of said projection beside said groove and being sufficiently resilient so that the span across said barbs is reduced as said wedge means expands said groove and urges said projection into engagement with the walls beside said slot.*

* * * * *